(12) United States Patent
Khan et al.

(10) Patent No.: US 8,903,774 B2
(45) Date of Patent: Dec. 2, 2014

(54) TECHNIQUES FOR LEVERAGING REPLICATION TO PROVIDE ROLLING POINT IN TIME BACKUP WITH SIMPLIFIED RESTORATION THROUGH DISTRIBUTED TRANSACTIONAL RE-CREATION

(75) Inventors: Shuab Khan, Bellevue, WA (US); Peter Byrne, Adalaide (AU); Yogesh Bansal, Sammamish, WA (US); Gregory Thiel, Black Diamond, WA (US); Ross Smith, IV, Bel Air, MD (US)

(73) Assignee: Microsoft Corporation, Redmond, WA (US)

( * ) Notice: Subject to any disclaimer, the term of this patent is extended or adjusted under 35 U.S.C. 154(b) by 105 days.

(21) Appl. No.: 13/425,876

(22) Filed: Mar. 21, 2012

(65) Prior Publication Data
US 2013/0198141 A1     Aug. 1, 2013

Related U.S. Application Data

(60) Provisional application No. 61/591,871, filed on Jan. 28, 2012.

(51) Int. Cl.
*G06F 17/30* (2006.01)
*G06F 11/14* (2006.01)

(52) U.S. Cl.
CPC ...... *G06F 17/30368* (2013.01); *G06F 11/1471* (2013.01)
USPC .......................................................... 707/657

(58) Field of Classification Search
USPC ............................................................ 707/7
See application file for complete search history.

(56) References Cited

U.S. PATENT DOCUMENTS

| | | | |
|---|---|---|---|
| 6,466,950 B1 * | 10/2002 | Ono | 1/1 |
| 7,624,133 B1 | 11/2009 | Ojalvo | |
| 7,661,028 B2 | 2/2010 | Erofeev | |
| 7,849,361 B2 | 12/2010 | Ahal et al. | |
| 2003/0126133 A1 * | 7/2003 | Dattatri et al. | 707/10 |
| 2004/0267809 A1 * | 12/2004 | East et al. | 707/104.1 |
| 2006/0182020 A1 | 8/2006 | Factor et al. | |
| 2006/0218204 A1 | 9/2006 | Ofer et al. | |
| 2011/0161299 A1 * | 6/2011 | Prahlad et al. | 707/649 |

OTHER PUBLICATIONS

"Cisco MDS 9000 SANTap", Retrieved at <<http://www.cisco.com/en/US/prod/collateral/ps4159/ps6409/ps10729/ps10746/data_sheet_c78-568960.pdf, Retrieved Date: Dec. 9, 2011, pp. 6.

(Continued)

*Primary Examiner* — Jay Morrison
(74) *Attorney, Agent, or Firm* — Louise Bowman; David Andrews; Micky Minhas

(57) ABSTRACT

Techniques to leverage replication to provide rolling point in time backup are described. Some embodiments are directed to techniques to provide rolling point in time backup with simplified restoration through distributed transactional re-creation. In one embodiment, for example, a technique may comprise creating a plurality of availability copies of a primary set of data; designating at least one of the plurality of availability copies as a backup copy; creating a log file that indicates changes to the primary set of data; updating the plurality of availability copies from the log file in near real time, without updating the backup copy; and restoring at least one of: the primary set of data and an availability copy using the backup copy and content resubmitted from a content contributor when an error occurs in at least one of: the primary set of data and an availability copy. Other embodiments are described and claimed.

20 Claims, 9 Drawing Sheets

(56) References Cited

OTHER PUBLICATIONS

"Understanding High Availability Factors", Retrieved at <<http://technet.microsoft.com/en-us/library/ee832790.aspx>>, Retrieved Date: Dec. 9, 2011, pp. 11.

"Improving Microsoft Exchange Server Recovery with EMC Recover Point", Retrieved at <<http://www.emc.com/collateral/software/white-papers/h2350-recoverpoint-ms-exchange-wp.pdf>>, Feb. 2011, pp. 19.

* cited by examiner

700

```
┌─────────────────────────────────────┐
│ DESIGNATE THE BACKUP COPY AS THE NEW │
│         AVAILABILITY COPY            │
│                                      │
│                 702                  │
└─────────────────────────────────────┘
                  │
┌─────────────────────────────────────┐
│ INSTRUCT A CONTENT CONTRIBUTOR TO RESUBMIT │
│ ITS CONTENT GENERATED BETWEEN NOW AND THE  │
│ BEGINNING OF THE CURRENT LAG TIME PERIOD   │
│                                            │
│                 704                        │
└─────────────────────────────────────┘
                  │
┌─────────────────────────────────────┐
│  UPDATE NEW AVAILABILITY COPY WITH THE │
│          RESUBMITTED CONTENT           │
│                                        │
│                  706                   │
└─────────────────────────────────────┘
                  │
┌─────────────────────────────────────┐
│ REPLICATE UPDATED NEW AVAILABILITY COPY TO │
│ GENERATE MULTIPLE AVAILABILITY COPIES      │
│                                            │
│                 708                        │
└─────────────────────────────────────┘
                  │
┌─────────────────────────────────────┐
│ DESIGNATE ONE OF THE NEW AVAILABILITY COPIES │
│         TO BE THE NEW BACKUP COPY            │
│                                              │
│                  710                         │
└─────────────────────────────────────┘
```

FIG. 7

TECHNIQUES FOR LEVERAGING REPLICATION TO PROVIDE ROLLING POINT IN TIME BACKUP WITH SIMPLIFIED RESTORATION THROUGH DISTRIBUTED TRANSACTIONAL RE-CREATION

RELATED APPLICATIONS

This application is a non-provisional of, and claims priority to, U.S. provisional application No. 61/591,871, filed Jan. 28, 2012, entitled "Techniques For Leveraging Replication To Provide Rolling Point In Time Backup With Simplified Restoration Through Distributed Transactional Re-Creation," which is incorporated by reference in its entirety.

BACKGROUND

Many computer services are being moved from on-premises installations to a cloud computing model. In a cloud computing model, applications, data storage and services may be provided as though the applications and data were on a local device, without having to install the applications and/or store the data on a local device. However, the applications and/or data storage may be implemented across many devices, servers, and data stores, accessible over a communication interface from a local device.

As a business, an entity may provide cloud-based services to many different customers. This may result in huge amounts of data needing to be stored, in some cases, on the order of petabytes ($10^{15}$ bytes) of data. Additionally, this data is expected to be available at all times to the customers, and to be free of errors such as logical corruption, operational errors, and physical corruption. Traditional backup methods may be operationally expensive and complex on this scale. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to leverage replication to provide rolling point in time backup. Some embodiments are particularly directed to techniques to provide rolling point in time backup with simplified restoration through distributed transactional re-creation. In one embodiment, for example, a technique may comprise creating a plurality of availability copies of a primary set of data; designating one of the plurality of availability copies as a backup copy; creating a log file that indicates changes to the primary set of data; updating the plurality of availability copies from the log file in near real time, without updating the backup copy; and restoring at least one of: the primary set of data and an availability copy using the backup copy and content resubmitted from a content contributor when an error occurs in at least one of: the primary set of data and an availability copy. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 7 illustrates an embodiment of a logic flow to restore data from the backup using distributed transactional re-creation.

DETAILED DESCRIPTION

Cloud-based multi-customer service providers, or any entity managing large amounts (e.g. petabytes) of stored data, have the challenge of ensuring data integrity and availability without increasing complexity and operational expenses. Cloud-based service providers often maintain several copies of a customer's data, referred to as an availability copy, in part to ensure accessibility when many individuals within the customer organization are accessing the data at once. Previous solutions for providing backups have reserved one of these availability copies as a backup and delayed updating the backup file to preserve the data at a point in time. It is, however, possible that the backup file could become damaged or physically corrupted. In order to safeguard the data in this scenario, previous solutions have maintained a second backup copy, or redundant storage. This solution, however, is not readily scalable and adds operational complexity.

Accordingly, various embodiments take advantage of the fact that, generally, the backup copy does not have to be available 100% of the time. In practice, a lower percentage of availability, e.g. about 95%, is still functional. Embodiments further take advantage of the availability copies that may already be in use by a cloud-based multi-customer service provider.

Various embodiments are directed to techniques to provide rolling point in time backups and simplified restoration. For example, in an embodiment, multiple availability copies are made for a set of customer data. One of those availability copies may be designated as a backup copy. Log files may be generated that reflect changes made to the customer data. The changes reflected in the log files may be made to the availability copies, while leaving the backup copy untouched. After a period of time, e.g. a week, the changes reflected in the log files may be applied to the backup copy to bring the backup copy up to date, and the backup copy may then be allowed to age again. Additionally, content contributors keep a local copy of the content they generate for the same time period. When an error occurs in the customer data, or in an availability copy, the backup copy may be updated using the content contributor's local copy and used to restore the customer data and/or the availability copies. Additional embodiments are described. As a result, the embodiments may improve efficiency, reliability and scalability in systems that store large amounts of data for immediate access by customers.

Figure 1:
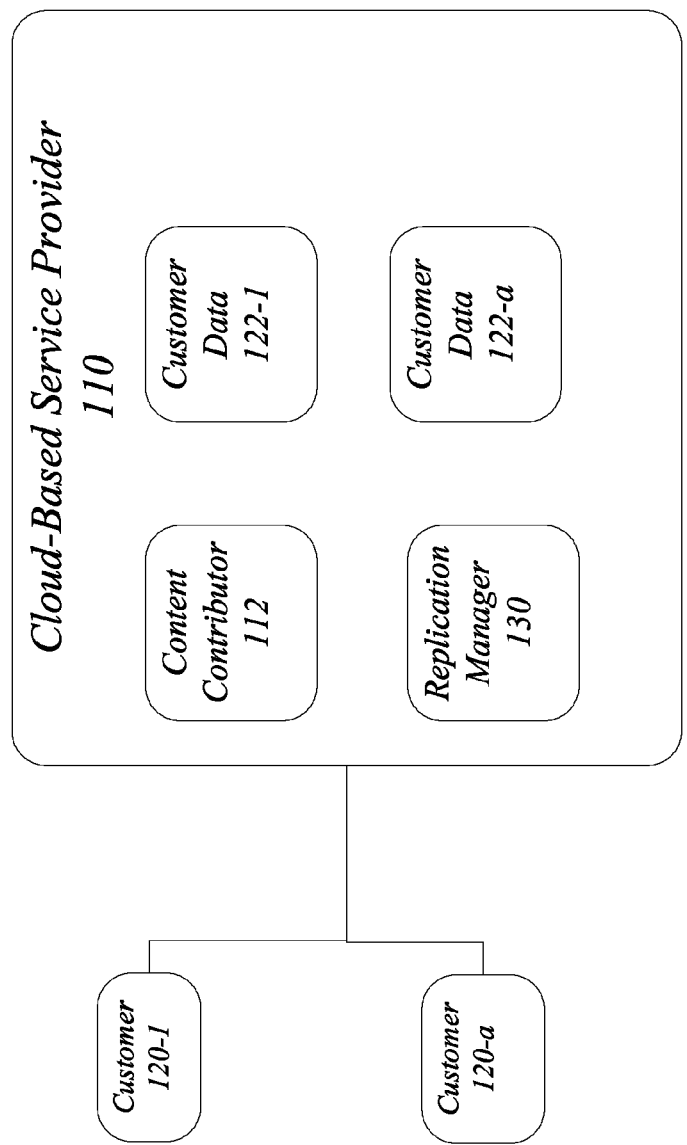
FIG. 1 illustrates an embodiment of a system to provide cloud-based multi-customer resources.

FIG. 1 illustrates a block diagram for a system 100 for providing cloud-based multi-customer resources. In one embodiment, for example, the system 100 may comprise a computer-implemented system 100 having multiple components, such as a cloud-based service provider 110 and a customer 120. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented with one or more electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

In various embodiments, the system 100 may comprise cloud-based service provider 110. Cloud-based service provider 110 may be physically embodied on one or more servers, in one or more physical locations, and may include many different electronic devices, such as servers, network hubs, storage arrays, and so forth (not shown) that together appear to a customer to be one source for services and data.

Regardless of physical configuration, cloud-based service provider 110 may appear, logically, as one device or system to external entities, such as customer 120.

Cloud-based service provider 110 may provide services such as, but not limited to, email service, document management service, personal contact information management, calendar service, business collaboration service, and so forth. Some examples of cloud-based service providers include, without limitation, MICROSOFT OFFICE 365®, MICROSOFT EXCHANGE®, MICROSOFT WEB SERVICE®, and MICROSOFT SHAREPOINT ONLINE®, all from MICROSOFT CORP. of Redmond, Wash., USA.

Cloud-based service provider 110 may include a content contributor 112. Content contributor 112 may be an application that provides a service, such as an email server-side application. Content contributor 112 may receive new content from a client or from other sources, and may generate content. Content contributor 112 may be, for example, an email application that receives and delivers email messages. Content contributor 112 may be, for example, a calendar management application that receives event information and sends alerts and reminders about calendar events. The embodiments are not limited to these examples. Although only one content contributor 112 is shown, cloud-based service provider 110 may have many content contributors 112.

In various embodiments, the system 100 may comprise one or more customers, such as customer 120-1 up to customer 120-a, where a represents a positive integer. A customer 120 may include an entity that is using the services provided by cloud-based service provider 110. A customer 120 may comprise one or more electronic devices that may communicate with cloud-based service provider 110 through wired or wireless communication media. A customer 120 may further include client-side applications that execute on the electronic devices to interact with cloud-based service provider 110.

In various embodiments, cloud-based service provider 110 may include customer data 122. Cloud-based service provider 110 may have multiple sets of customer data, one corresponding to each customer. For example, customer data 122-1 may belong to customer 120-1, and customer data 122-a may belong to customer 120-a. In an embodiment, customer data 122 may include content from one (or more) content contributor 112. In an embodiment, customer data 122 that is generated by different content contributors 112 may be stored in a logical separate manner. Customer data 122 may be stored in one or several different physical locations, for example, on different storage devices and/or in different buildings or different geographical locations.

In various embodiments, cloud-based service provider 110 may include a replication manager 130. Replication manager 130 may coordinate replication, backup and restoration processes. Replication may refer to creating enough copies of a customer's customer data 122 to provide access without service interruption. Backup may refer to maintaining a copy of a customer's customer data 122 that may be used to preserve the data at various points in time in case of damage or error. Restoration may refer to repairing a customer's customer data 122 when damage or error occurs.

Figure 2:
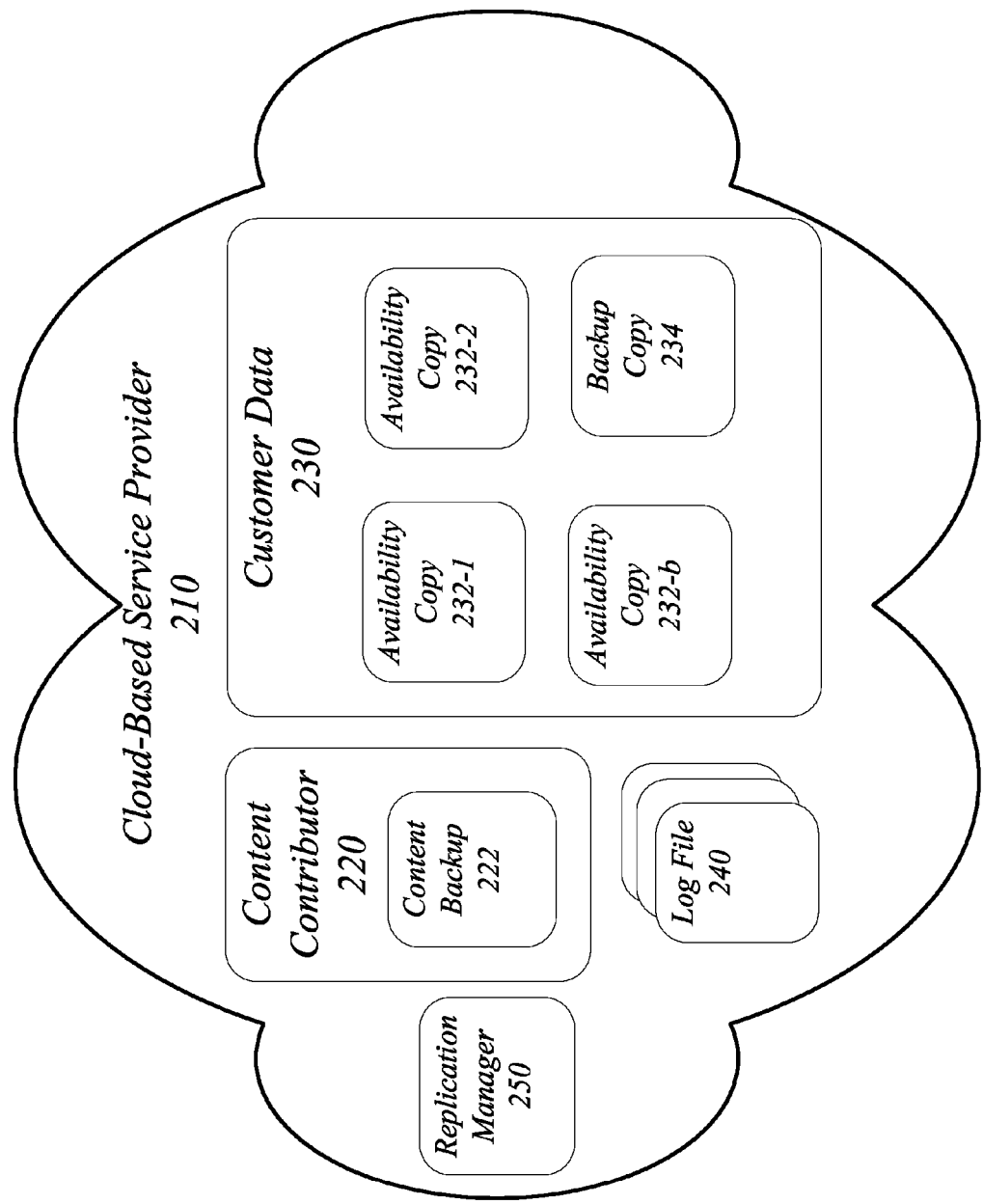
FIG. 2 illustrates an embodiment of a cloud-based service provider.

FIG. 2 illustrates a block diagram of a cloud-based service provider 210. Cloud-based service provider 210 may be a representative example of cloud-based service provider 110. Content contributor 220 and customer data 230 may be representative examples of content contributor 112 and customer data 122, respectively. Replication manager 250 may be a representative example of replication manager 130.

Content contributor 220 may include a content backup 222. Content backup 222 may be stored separately from customer data 230. Content backup 222 may include all of the content received and/or generated, and actions taken by content contributor 220 within a recent time period, e.g. the past 7 days. Content backup 222 may include any data needed to allow content contributor 220 to re-create all actions taken within the recent time period. Content backup 222 may be used to restore damaged customer data 230, as will be described further below.

In various embodiments, customer data 230 may be replicated into one or more availability copies, such as availability copy 232-1, 232-2, up to 232-b, where b represents a positive integer. Availability copies 232 may be stored separately from each other, for example, on different physical computer-readable storage media. An availability copy 232 serves as near real-time copy of customer data 230 that can improve accessibility to customer data 230 when high levels of access are encountered.

In an embodiment, one copy of an availability copy 232 may be designated as a backup copy 234. A backup copy 234 may begin at the same point in time as an availability copy 232, but may not be updated in near real-time as an availability copy would be. Periodically, backup copy 234 may be updated to a point in time between its last update and near real-time, and then allowed to age with respect to the availability copes 232 until a subsequent update time.

In various embodiments, cloud-based service provider 210 may include log files 240. A log file 240 may include changes made to customer data 230. Log files 240 may be used to keep availability copies 232 up-to-date with respect to customer data 230 in near real-time. For example, the changes made to customer data 230 may be applied to a current state of availability copy 232 just after the changes were made to customer data 230 by reading the log file 240 and applying the changes reflected therein. In an embodiment, a log file 240 may include changes made to multiple sets of customer data 230 belonging to multiple customers.

Figure 3:
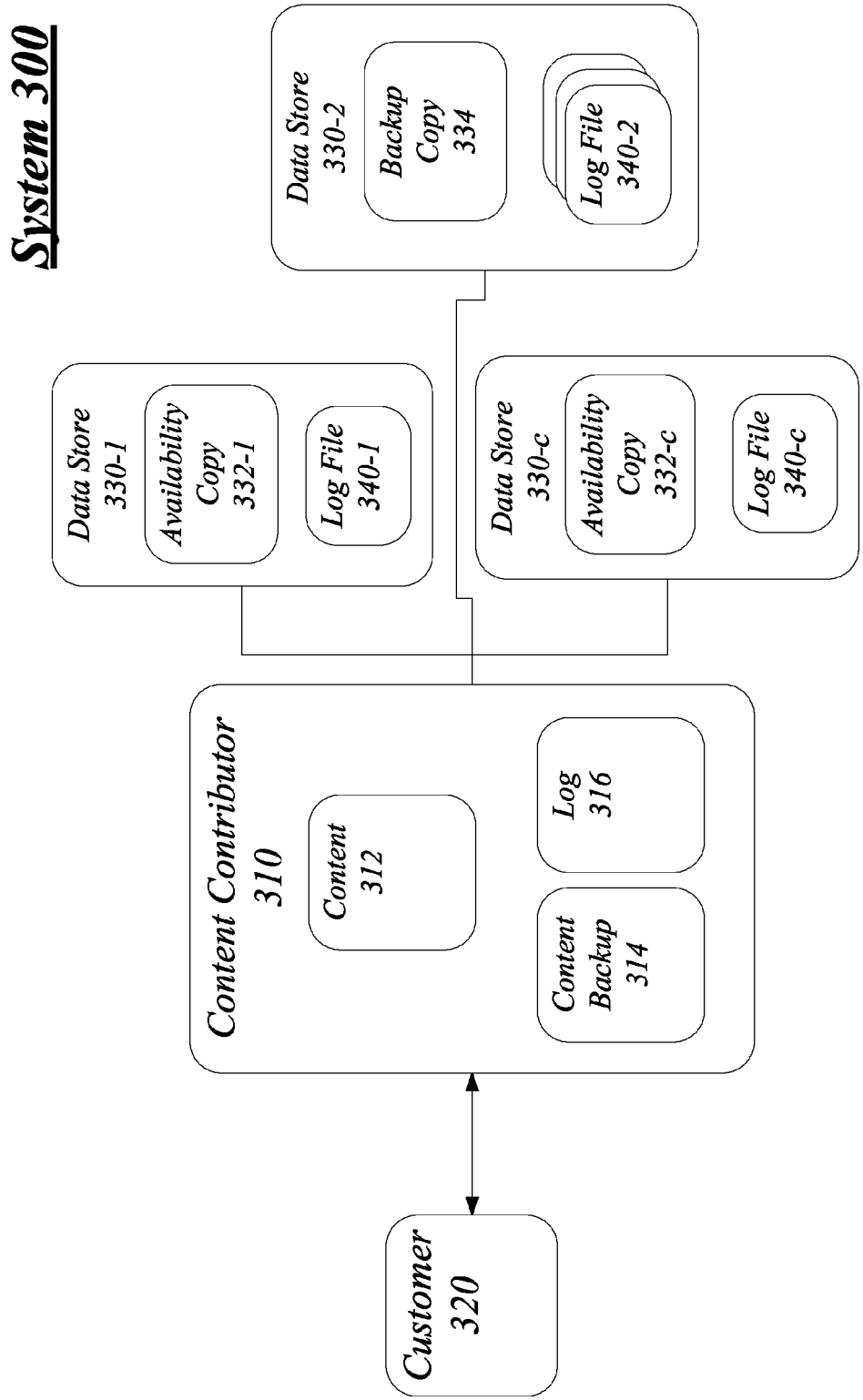
FIG. 3 illustrates an embodiment of a second system to provide rolling point in time backups.

Although FIG. 3 shows only one set of customer data 230, cloud-based service provider 210 may have multiple customers and therefore multiple sets of customer data.

The components of cloud-based service provider 210, such as content contributor 220 and backup manger 250, may be communicatively coupled via various types of communications media. The components 220 and 250 may coordinate operations between each other. The coordination may involve the uni-directional or bi-directional exchange of information. For instance, the components 220 and 250 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

FIG. 3 illustrates an embodiment of a second system to provide rolling point in time backups. System 300 has elements in common with system 100 and cloud-based service provider 210. In an embodiment, system 300 may be implemented as a conventional server, instead of as a cloud computing implementation. Content contributor 310 and content backup 314 may be representative examples of content contributor 112, 210, and content backup 222, respectively. Customer 320 may be a representative example of customer 120.

In various embodiments, content contributor 310 may include content 312 that represents an up-to-date, primary set of data for a customer that uses content contributor 310. If content contributor 310 is an email application, for example, then content 312 may represent the contents of some or all of the mailboxes of the email accounts that are provided to customer 320. Incoming email would appear in content 312 as soon as it is received by content contributor 310. Content 312 may be the customer data that is replicated in availability copies 332 and in backup copy 334.

Content backup 314 may include a record of all of the actions taken by content contributor 310 on content 312, including generated, received, and deleted content.

In various embodiments, content contributor 310 may also include a log 316. Log 316 may be a representative example of a log file 240. Log 316 may include changes made to content 312 over the course of a time period.

The availability copies 332 made from content 312 may be stored in separate data stores 330-1 to 330-c, where c represents a positive integer. The data stores 330 may be separated onto separate physical stores, or may be logically separated on the same physical store. In an embodiment, log 316 may be copied to the data stores 330 as a log file 340. Log file 340 may then be used to update the availability copy 332 on the same data store 330 to make availability copy 332 as close to a real-time version of content 312 as possible.

In various embodiments, as previously described, one availability copy is designated to be a backup copy 334. In an embodiment, log 316 may be copied to data store 330-2 as log file 340-2. However, the log file 340-2 is not applied to backup copy 334. The log files 340-2 may be stored for a lag time period, for example, for seven days without being applied to backup copy 334. This allows the backup copy to age with respect to content 312 and availability copies 332.

At the end of the lag time period, some or all of log files 340 may be applied to backup copy 334 to advance the backup copy 334 in time. In an embodiment, an oldest subset of log files 340-2 may be applied. For example, suppose it is desired to have backup copy 334 always be 7 days behind content 312. Once at least one log file 340-2 is seven days old, the log files 340-2 that are 7 days old may be applied to backup copy 334. In another embodiment, all of the log files 340-2 that have accumulated during the lag time period may be applied at once to backup copy 334, bringing backup copy 334 up to date temporarily. The embodiments are not limited to these examples.

In an embodiment, when an error or damage occurs to content 312 and/or availability copies 332, replication manager 150, 230 may designate backup copy 334 to be the new availability copy. Replication manager 150, 230 may then instruct content contributor 112, 220, 310 to re-submit all of its activity for the past lag time period, e.g. content backup 314. Backup copy 334 may then receive content backup 314. Once content backup 314 is applied to the new availability copy (formerly backup copy 334) may the new availability copy can be copied to the other data stores 330, replacing the damaged copies. In an embodiment, if content 312 is damaged, then it may be restored by replacing it with the new availability copy made from backup copy 334 and content backup 314. This procedure negates the need to determine when the damage occurred, as some or all of the data from the lag time period is restored. In some embodiments, data that is not part of a transaction, such as status or flag on an item, may not be restored.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 4:
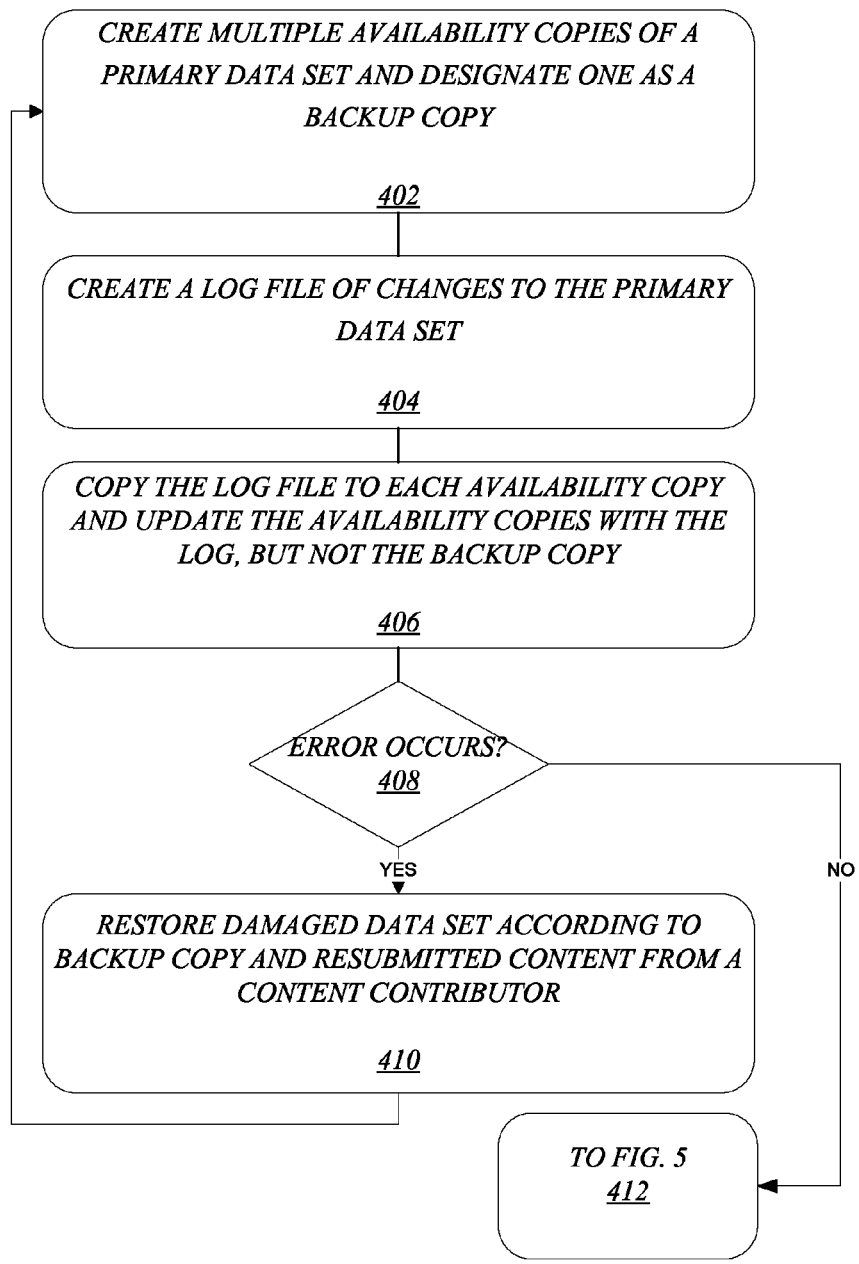
FIG. 4 illustrates an embodiment of a logic flow to leverage replication to provide backup.

FIG. 4 illustrates an embodiment of a logic flow 400 to leverage replication to provide backup.

In various embodiments, logic flow 400 may create multiple availability copies of a primary data set and designate one as a backup copy in block 402. For example, replication manager 130, 250 may create copies of content 312 to make availability copies 232, 332. Replication manager 130, 250 may further designate one of the availability copies to be a backup copy 234, 334.

In various embodiments, logic flow 400 may create a log file of changes to the primary data set in block 404. For example, content contributor 112, 220, 310 may generate a log file 316 that describes the changes made to content 312. The log file of changes may further be copied to the locations of the availability copies and the backup copy.

In various embodiments, logic flow 400 may copy the log file to each availability copy and update the availability copies with the log file in block 406, but not the backup copy. For example, replication manager 130, 250 may copy log file 360 to log files 340 and then cause the availability copies 232, 332 to be updated with the changes described in the log file(s) to create a near real-time copy of content 312. However, the changes described in the log file(s) are not applied to backup copy 234, 334.

In various embodiments, logic flow 400 determines whether an error has occurred in block 408. For example, system 100, 300 or cloud-based service provider 110, 210 may detect that a computer-readable storage medium storing content 312, customer data 122, 230, and/or availability copies 232, 332 is physically damaged. Other errors that may be detected, either by device or human administrator, may include logical corruption, accidental or malicious deletions or alterations of data, any other condition that may make restoration from a backup necessary, and so forth.

In various embodiments, logic flow 400 may restore the damaged data set according to the backup copy and resubmitted content from a content contributor in block 410, when an error has occurred. The operations of block 410 are described in further detail with respect to FIG. 7.

Figure 5:
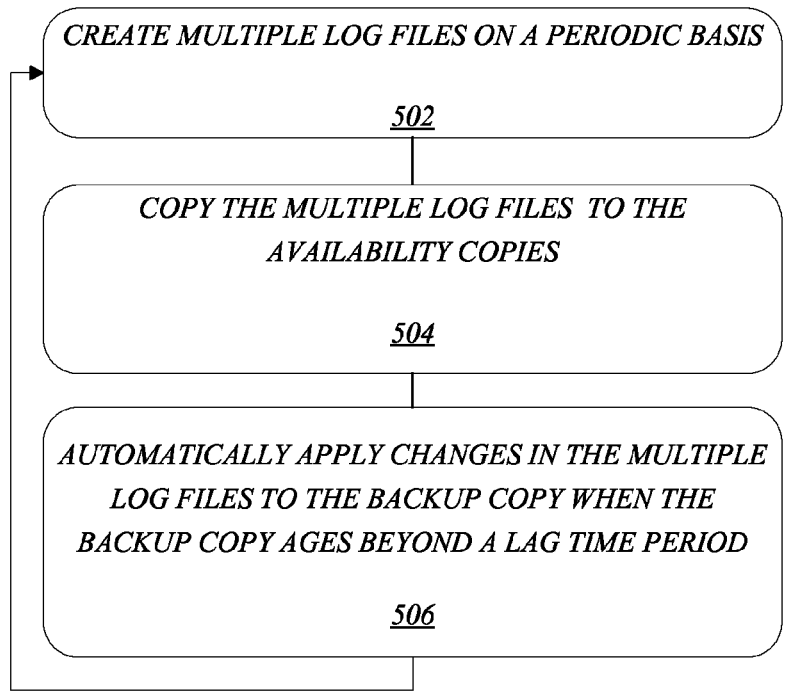
FIG. 5 illustrates an embodiment of a logic flow to provide a rolling point in time backup.

In various embodiments, logic flow 400 may proceed to logic flow 500 shown in FIG. 5 in block 412, when an error has not occurred. Alternatively, logic flow 400 may repeat, beginning at block 404 (not shown).

FIG. 5 illustrates an embodiment of a logic flow 500 to provide a rolling point in time backup.

In various embodiments, logic flow 500 may create multiple log files on a periodic basis in block 502. For example, replication manager 130-250 may cause log 316 to be stored as log files 340-2. The log files may be created at some time interval, e.g. once a day, once an hour, once every second, and so forth. The time interval may be shorter than the lag time period. For example, if the lag time period is some number of hours or days, then the log files 340-2 may be created on an hourly or daily basis, respectively.

In various embodiments, logic flow 500 may copy the multiple log files to the availability copies in block 504. In various embodiments, the copying may take place as soon as the log files are created, closed, or the operation is completed.

In various embodiments, logic flow 500 may automatically apply changes in the copied multiple log files to the backup copy when a log storage period has expired in block 506. For example, when the backup copy becomes older than a lag time period (e.g. 7 days), then replication manager 130, 250 may direct some or all of the log files 340-2 to be applied to backup copy 234, 334 to make backup copy 234, 334 younger than the lag time period.

Logic flow 500 may repeat beginning at block 502, or may return to block 404 in logic flow 400 until an error occurs.

Figure 6:
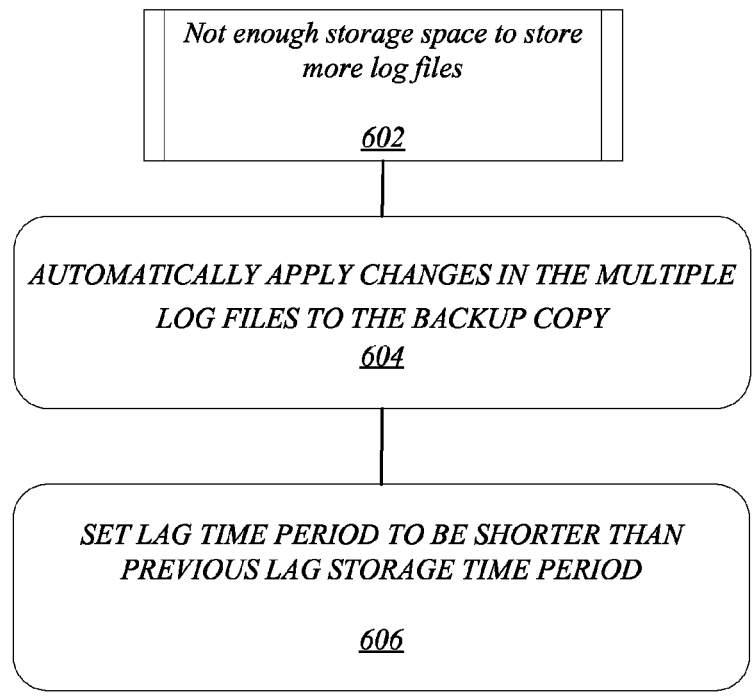
FIG. 6 illustrates an embodiment of a logic flow to adjust the point in time backup.

FIG. 6 illustrates an embodiment of a logic flow 600 to adjust the point in time backup.

In various embodiments, logic flow 600 may be invoked when there is not enough storage space to store more log files, in block 602. For example, an administrator or automatic detection mechanism may determine that the storage space available is insufficient to store the log files required for a 10-day lag period.

In various embodiments, logic flow 600 may automatically apply the changes from the multiple logs files to the backup copy in block 604. For example, replication manager 130, 250 may apply all of the log files from within the current lag time period to backup copy 334 to bring it up to date.

In various embodiments, logic flow 600 may set the lag time period to be shorter than the previous lag time period in block 606. For example, replication manager 130, 250 may lower the lag time period from 10 days to 4 days. From this point, backup copy 334 may be allowed to lag, e.g. having no changes applied, until it has aged to the new lag time period.

In an embodiment, when there is insufficient storage space for more log files, but not enough time has passed, for example, fewer than four hours, logic flow 600 may be delayed in order to prevent removing the backup for what may be a short term issue.

FIG. 7 illustrates an embodiment of a logic flow 700 to restore data from the backup using distributed transactional re-creation when an error has occurred or restoration is otherwise needed. Logic flow 700 may be an embodiment of block 410 from FIG. 4.

In various embodiments, logic flow 700 may designate the backup copy as the new availability copy in block 702. For example, replication manager 130, 250 may change a status of the backup copy 234, 334 from backup copy to availability copy. In an embodiment, the previous availability copies may be deleted or moved from their respective data stores, or otherwise disabled from being used as availability copies. In an embodiment, if content 312 is the source of the error, then content 312 may also be disabled or rendered inaccessible to the customers.

In various embodiments, logic flow 700 may instruct a content contributor to resubmit its content that was generated between now and the beginning of the current lag time period in block 704. For example, replication manager 130. 250 may instruct content contributor 112, 220, 310 to resubmit content backup 222, 314. Resubmitting content backup 222, 314 may also include resending the content from content backup 222, 314 to the customer. For example, if content contributor 112, 220, 310 is an email application, resubmitting may include re-delivering all email from the duration of the lag time period.

In various embodiments, logic flow 700 may update the new availability copy with the resubmitted content in block 706. For example, the new availability copy, which is the old backup copy, may be updated by re-creating all of the transactions taken by the content contributor during the lag time period.

In various embodiments, logic flow 700 may replicate the updated new availability copy to generate multiple availability copies in block 708. The newly restored availability copy may be copied to replace the damaged or suspect availability copies previously in place. In an embodiment, a damaged client data 112 may be replaced from the restored availability copy.

In various embodiments, logic flow 700 may designate one of the new availability copies to be the new backup copy in block 710. Once one of the availability copies is designated to be a backup copy, the backup and restoration process may restart.

Figure 8:
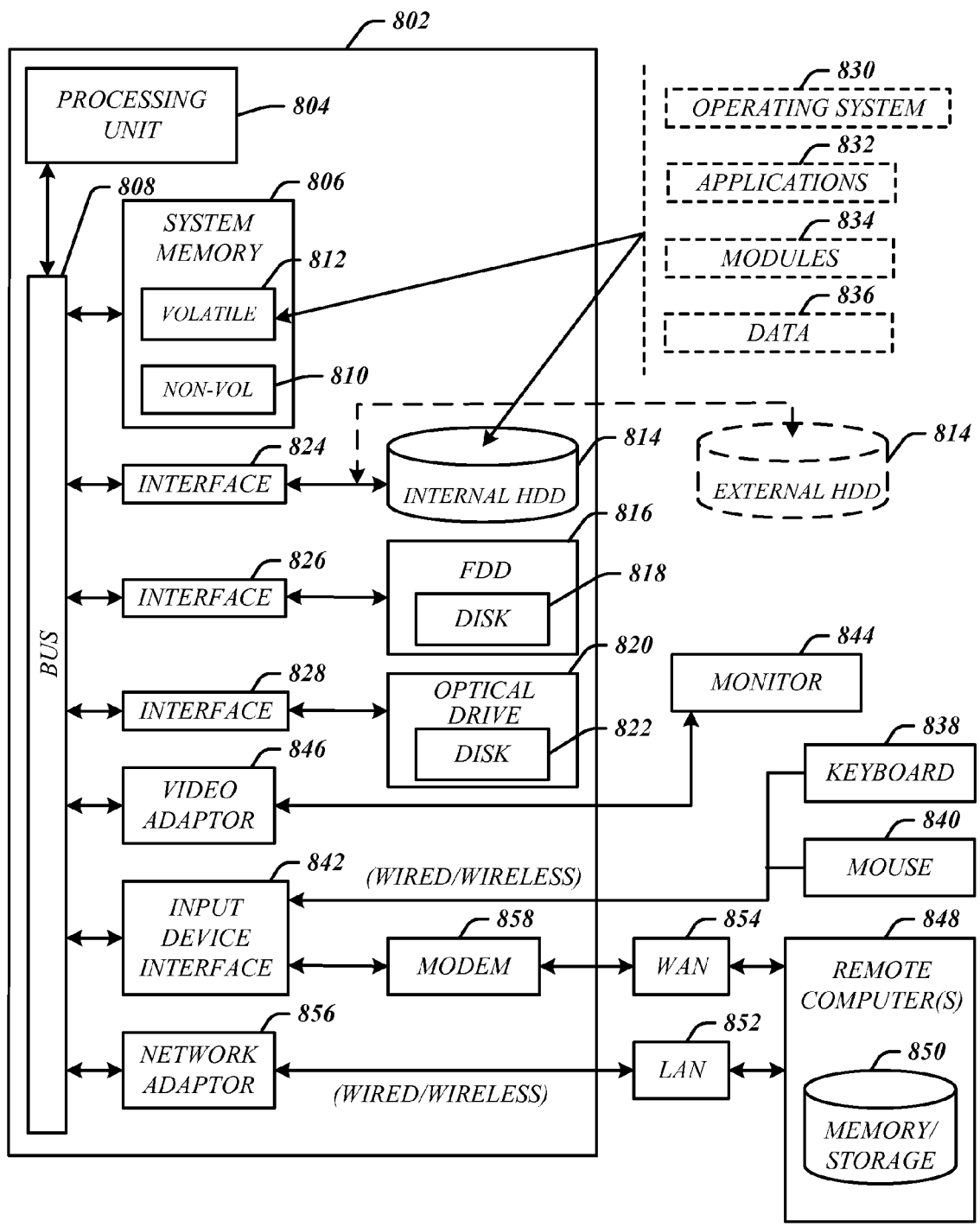
FIG. 8 illustrates an embodiment of a computing architecture.

FIG. 8 illustrates an embodiment of an exemplary computing architecture 800 suitable for implementing various embodiments as previously described. The computing architecture 800 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors. Dual microprocessors and other multi-processor architectures may also be employed as the processing unit 804. The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures.

The system memory 806 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media, including an internal hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable storage media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. The one or more application programs 832, other program modules 834, and program data 836 can include, for example, content contributor 112, 220, 310, and replication manager 130, 250.

A user can enter commands and information into the computer 802 through one or more wire/wireless input devices, for example, a keyboard 838 and a pointing device, such as a mouse 840. Other input devices may include a microphone, an infra-red (IR) remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 9:
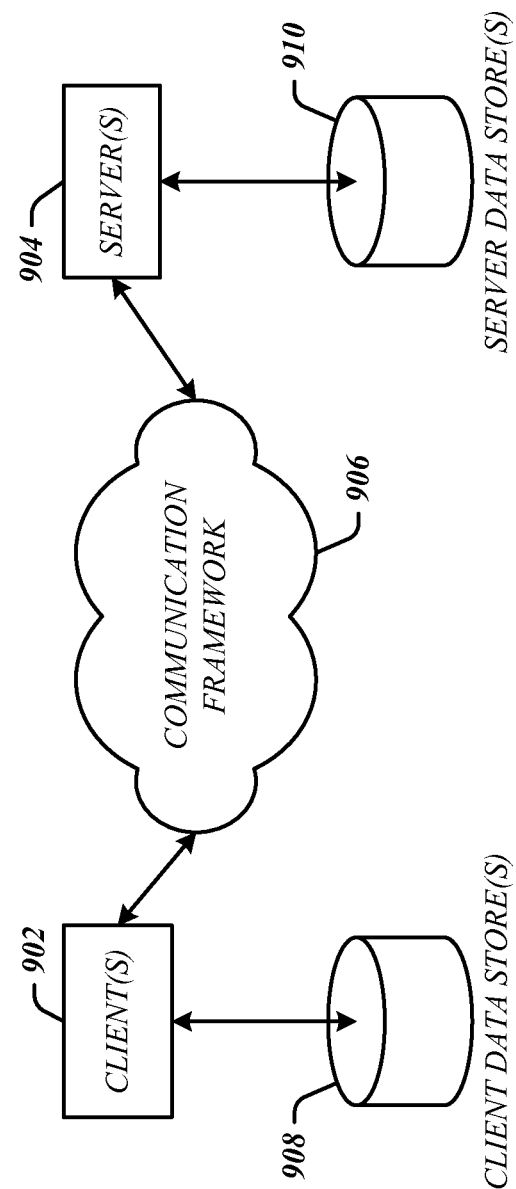
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, and so forth. The embodiments, however, are not limited to implementation by the communications architecture 900.

As shown in FIG. 9, the communications architecture 900 comprises includes one or more clients 902 and servers 904. The clients 902 may implement the client device 130. The servers 904 may implement the server systems for web services server 110, 210. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 902 and the servers 904 may include various types of standard communication elements designed to be interoperable with the communications framework 906, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 902 and a server 904 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
creating a plurality of availability copies of a primary set of data;
designating at least one of the plurality of availability copies as a backup copy;
creating a log file that indicates changes to the primary set of data;
updating the plurality of availability copies from the log file in near real time, without updating the backup copy; and
restoring at least one of: the primary set of data and an availability copy using the backup copy and content resubmitted from a content contributor when an error occurs in at least one of: the primary set of data and an availability copy.

2. The method of claim 1, further comprising:
creating a plurality of log files, each log file indicating changes made to the primary set of data at different times, wherein the length of the different times is shorter than a lag time period.

3. The method of claim 2, further comprising:
automatically applying a change from at least one of the plurality of log files to the backup copy when the at least one log file ages to be older than the lag time period.

4. The method of claim 2, further comprising:
automatically applying the changes in the plurality of log files to the backup copy when not enough storage space exists to store additional log files; and
setting the lag time period to be shorter than a previous lag time period.

5. The method of claim 2, further comprising:
designating the backup copy as a new availability copy when an error occurs;
instructing the content contributor to resubmit its content generated in the time between the beginning of the lag time period and the present to a receiver, wherein the content contributor is an application that performs a service;
receiving the resubmitted content;
updating the new availability copy with the resubmitted content;
replicating the new availability copy to generate a plurality of availability copies; and
designating one of the plurality of availability copies as a backup copy.

6. The method of claim 5, wherein updating the new availability copy comprises:
re-creating all transactions taken by the content contributor according to the resubmitted content on the new availability copy.

7. The method of claim 5, wherein instructing the content contributor to resubmit comprises:
re-creating all transactions taken by the content contributor according to the resubmitted content to a customer to whom the primary set of data belongs.

8. An article comprising a computer readable storage medium comprising instructions that when executed cause a system to:
create a plurality of availability copies of a primary data set;
designate at least one of the plurality of availability copies as a backup copy;
create a log file that indicates changes to the primary data set;
update the plurality of availability copies from the log file in near real time, without updating the backup copy; and
restore at least one of: the primary set of data and an availability copy using the backup copy and a content backup resubmitted from a content contributor when an error occurs in at least one of: the primary data set and an availability copy.

9. The article of claim 8, the medium further comprising instructions that when executed cause the system to:
create a plurality of log files, each log file indicating changes made to the primary data set at different times, wherein the length of the different times is shorter than a lag time period.

10. The article of claim 9, the medium further comprising instructions that when executed cause the system to:
automatically apply a change from at least one of the plurality of log files to the backup copy when the at least one log file ages to be older than the lag time period.

11. The article of claim 9, the medium further comprising instructions that when executed cause the system to:
automatically apply the changes in the plurality of log files to the backup copy when not enough storage space exists to store additional log files; and
set the lag time period to be shorter than a previous lag time period.

12. The article of claim 9, the medium further comprising instructions that when executed cause the system to:
designate the backup copy as a new availability copy when an error occurs;
instruct a content contributor to resubmit its content generated in the time between the beginning of the lag time period and the present to a receiver, wherein the content contributor is an application that performs a service;
receive the resubmitted content;
update the new availability copy with the resubmitted content;
replicate the new availability copy to generate a plurality of availability copies; and
designate one of the plurality of availability copies as a backup copy.

13. The article of claim 12, the medium further comprising instructions that when executed cause the system to:
re-create all transactions taken by the content contributor according to the resubmitted content on the new availability copy.

14. The article of claim 12, the medium further comprising instructions that when executed cause the system to:
re-create all transactions taken by the content contributor according to the resubmitted content to a customer to whom the primary set of data belongs.

15. An apparatus, comprising:
a processing unit;
a memory to store customer data comprising a primary data set and a plurality of availability copies;
a content contributor executing on the processing unit to:
generate and update the primary data set;
create a log file that indicates changes to the primary data set; and
maintain a content backup including content generated within a time period; and
a replication manager executing on the processing unit to:
designate at least one of the availability copies to be a backup copy;
update the plurality of availability copies from the log file in near real time, without updating the backup copy; and
restore at least one of: the primary set of data and an availability copy using the backup copy and the content backup resubmitted from the content contributor when an error occurs in at least one of: the primary data set and an availability copy.

16. The apparatus of claim 15, the replication manager further to:
create a plurality of log files, each log file indicating changes made to the primary data set at different times, wherein the length of the different times is shorter than a lag time period.

17. The apparatus of claim 16, the replication manager further to:
automatically apply a change from at least one of the plurality of log files to the backup copy when the at least one log file ages to be older than the lag time period.

18. The apparatus of claim 16, the replication manager further to:
automatically apply the changes in the plurality of log files to the backup copy when not enough storage space exists to store additional log files; and
set the lag time period to be shorter than a previous lag time period.

19. The apparatus of claim 16, the replication manager further to:
designate the backup copy as a new availability copy when an error occurs;
instruct a content contributor to resubmit its content generated in the time between the beginning of the lag time period and the present to a receiver, wherein the content contributor is an application that performs a service;
receive the resubmitted content;
update the new availability copy with the resubmitted content;
replicate the new availability copy to generate a plurality of availability copies; and
designate one of the plurality of availability copies as a backup copy.

20. The apparatus of claim 15, further comprising:
a plurality of memories, wherein each availability copy is stored on a separate memory.

* * * * *